(12) United States Patent
Kochmanski et al.

(10) Patent No.: US 11,230,304 B2
(45) Date of Patent: Jan. 25, 2022

(54) DEVICE DISSIPATING ENERGY OF RAIL CAR COLLISIONS

(71) Applicant: AXTONE SPOLKA AKCYJNA, Kanczuga (PL)

(72) Inventors: Jan Kochmanski, Sietesz (PL); Jan Kukulski, Kosina (PL); Leszek Wasilewski, Gniewczyna (PL); Grzegorz Zurawski, Kanczuga (PL)

(73) Assignee: AXTONE SPOLKA AKCYJNA, Kanczuga (PL)

( * ) Notice: Subject to any disclaimer, the term of this patent is extended or adjusted under 35 U.S.C. 154(b) by 251 days.

(21) Appl. No.: 16/614,305

(22) PCT Filed: May 22, 2018

(86) PCT No.: PCT/EP2018/063420
§ 371 (c)(1),
(2) Date: Nov. 15, 2019

(87) PCT Pub. No.: WO2018/215493
PCT Pub. Date: Nov. 29, 2018

(65) Prior Publication Data
US 2020/0172129 A1    Jun. 4, 2020

(30) Foreign Application Priority Data

May 22, 2017   (PL) ..................... P.421675

(51) Int. Cl.
*B61G 11/16*     (2006.01)
*F16F 7/12*      (2006.01)

(52) U.S. Cl.
CPC ............. *B61G 11/16* (2013.01); *F16F 7/127* (2013.01)

(58) Field of Classification Search
CPC . B61G 11/16; B61G 11/18; B61G 9/04; F16F 7/127; B60R 19/34
See application file for complete search history.

(56) References Cited

U.S. PATENT DOCUMENTS

| | | | |
|---|---|---|---|
| 9,290,189 B2 * | 3/2016 | Kukulski | B61G 9/18 |
| 10,252,734 B2 * | 4/2019 | Kukulski | B61G 11/18 |
| 10,994,755 B2 * | 5/2021 | Kukulski | B61G 11/18 |
| 2013/0270210 A1 * | 10/2013 | Kukulski | B61G 11/16 213/62 R |
| 2017/0361855 A1 * | 12/2017 | Kukulski | B61G 11/16 |
| 2020/0164903 A1 * | 5/2020 | Kukulski | B61D 3/10 |

FOREIGN PATENT DOCUMENTS

| | | | | |
|---|---|---|---|---|
| EP | 2977289 A1 * | 1/2016 | | B61G 11/16 |
| WO | WO-2016088012 A1 * | 6/2016 | | B61G 11/16 |

\* cited by examiner

*Primary Examiner* — Zachary L Kuhfuss
(74) *Attorney, Agent, or Firm* — Hertzberg, Turk & Associates, LLC

(57) ABSTRACT

A device has a rod (8) mounted in an articulated support (1), suitable for cutting with a cutting tool, the articulated support (1) comprising a body (3) with an internal spherical surface (5), in which a movable external spherical surface (4) of an inner ring (2) is embedded. In addition, the inner ring (2) of the articulated support (1) has at least one cutting knife (10, 10a) designed to cut the outer layer of the rod (8).

15 Claims, 9 Drawing Sheets

DEVICE DISSIPATING ENERGY OF RAIL CAR COLLISIONS

CROSS REFERENCE TO RELATED APPLICATION

This application is a U.S. National Stage filing under 35 U.S.C. § 371 of International Application No. PCT/EP2018/063420 filed May 22, 2018. The disclosure of the PCT Application is hereby incorporated herein by reference in its entirety.

The present invention provides a device for dissipating rail car collision energy, applicable in particular to railway central couplers.

A collision energy dissipation device is described in Patent PL202114, said device comprising a single-segment rod suitable for cutting by means of surrounding cutting tools placed uniformly in the body sleeve. In order to ensure proper guiding of the cutting tools, the blades of said tools are placed in guides formed on the outer surface of the rod.

Also, WO2016088012A1 discloses a railway car impact energy dissipation device, which comprises a single-segment rod with an angled guide part, extending into a part suitable for cutting. This rod is pivoted through a lug in an the inner part of the support equipped with cutting tools.

An energy dissipation device comprising a two-segment rod mounted in an opening of a housing equipped with cutting tools is also described in EP2977289A1. This two-segment rod consists of two cylindrical parts, with the first cylindrical segment of the rod being connected to its second cylindrical segment by means of a hinge.

The object of the invention is to develop a device for dissipating collision energy, operating efficiently under conditions of angular deflections between interconnected railway cars and upon increased impacts.

The device of the invention, has a rod mounted in an articulated support, wherein the said rod is suitable for cutting with a cutting tool. The solution is characterized in that the articulated support comprises a body with an inner spherical surface, in which the outer spherical surface of the inner ring is movably set, with the inner support ring of the articulated support having at least one cutting knife designed to cut the outer layer of the rod.

Preferably, the inner ring of the articulated support is connected to the rod by means of a breakable element in a form of a fastening ring.

Preferably, the cutting knife is shaped in a form of a ring with an annular cutting part.

Preferably, the cutting knife forms a part of the inner ring of the articulated support.

Preferably, the cutting knife is in a form of an annular insert set in a front-end undercut of the inner ring the articulated support.

Preferably, a stabilizing sleeve is placed inside the inner ring of the articulated support, between the cutting part of the cutting knife and the mounting ring.

Preferably, the body of the articulated support is made in a form of two interconnected plates, wherein a part of the inner spherical surface is formed in each of these plates.

Preferably, the body of the articulated support is made of two plates interconnected frontally.

Preferably, the body of the articulated support is made of two plates interconnected perpendicularly to the axis of the rod, with the parting plane of these plates being situated on the axis of the rod.

Preferably, the articulated support has a cone-shaped pleated cover on one side attached to the front surface of the body and, on the other side mounted on the periphery of the rod.

Preferably, the articulated support has a protective lid attached to the outer front surface of the body.

Preferably, the rod is in a form of a single-segment sleeve.

Preferably, the rod has longitudinal grooves on its outer cylindrical surface.

Preferably, the rod has an end in a form of a front outer ring and in its inner space has a stopper ring set away from the front surface.

Preferably, the articulated support body has through-holes for connection thereof with the rail vehicle end sill.

The use of the articulated support in which the inner ring is pivotally joined to the outer body mounted thereon and the junction of this inner ring with a cutting knife intended to cut the outer layer of the rod ensures uniform guiding of the cutting tool, parallel to the axis of the rod. Such a construction of the articulated support also ensures even cutting of the surface layer of the rod in case of initial angular deflections between the railway cars striking each other. The forces created by the railway cars pressing against each other and acting on the joint in such a position, initiate an immediate cutting process and thus cause immediate dissipation of the initial collision energy. As a result the forces that may cause further deflection are reduced, and consequently the derailment of thus connected railway cars may be prevented.

The object of the invention is exemplified in the drawing, wherein:

FIG. 8 shows the whole device, such as in FIG. 2 during the step of the dissipation of collision energy through the rod cutting process, in axonometric view; while

Figure 1:
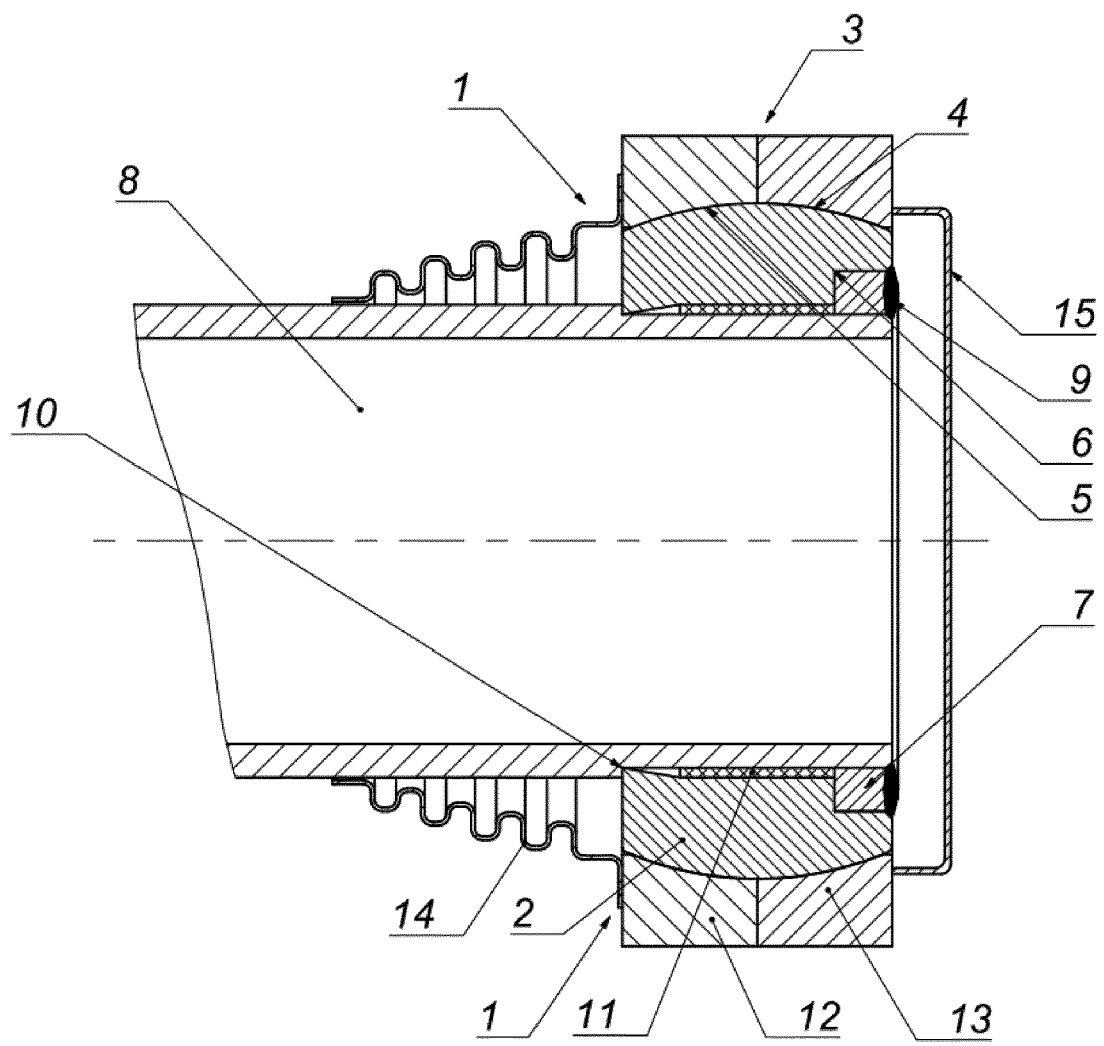
FIG. 1 shows a fragment of the device according to the invention, dissipating the energy shock of railway cars colliding with each other, in a rested state, before collision, in an axial cross-section.

As shown in one embodiment in FIG. 1, the railway car energy dissipation device is provided with an articulated support 1, which is formed by an inner ring 2 housed in the outer body 3. The outer spherical surface 4 of the inner ring 2 is movably interlocked with the inner spherical surface 5 of the body 3, which means that the spherical surfaces 4 and 5 can perform rotational movements relative to each other, around three axes. In the front part of the inner ring 2, in the undercut 6, a breakable ring 7 is set, connecting the inner ring 2 to the rod 8 through the weld 9. The rod 8 is in the form of a one-segment steel sleeve with a face layer suitable for cutting.

The fastening ring 7, connected by welding, has a specified breaking strength. The appropriate selection of the thickness and length of the weld 9 allows for determining the limit force at which the fastening ring 7 separates from the rod 8; and thus allows for determining the limiting energy between crashing railway cars, at which the step of absorbing kinetic energy by machining is initiated. To this end, the inner ring 2 has a shaped cutting knife 10 with an annular cutting part at its front end. The cutting part of the cutting knife 10 is placed on a smaller diameter than the outer diameter of the portion of the rod 8 to be cut.

In the inner ring 2, between the annular cutting part of the cutting knife 10 and the fastening ring 7, a plastic stabilizing sleeve 11 is mounted.

In order to facilitate the assembly of the articulated support 1, the body 3 is made of two plates 12 and 13 interconnected by fastening means not shown in FIG. 1, wherein each of the joined plates has a shaped part of the inner spherical surface 5. In the preferred embodiment, the plates 12 and 13 are joined fronally.

The articulated support 1 has a pleated cone-shaped cover 14 filled with a lubricant. The cone-shaped pleated shell 14 it is mounted on one side on the periphery of the rod 8 and attached on the other side to the inner front surface of the body 3. A protective lid 15 is attached to the outer front surface of the body 3. The pleated cone-shaped cover 14 and the protective lid 15 ensure the tightness of the articulated support and thus the stability of the device.

Figure 2:
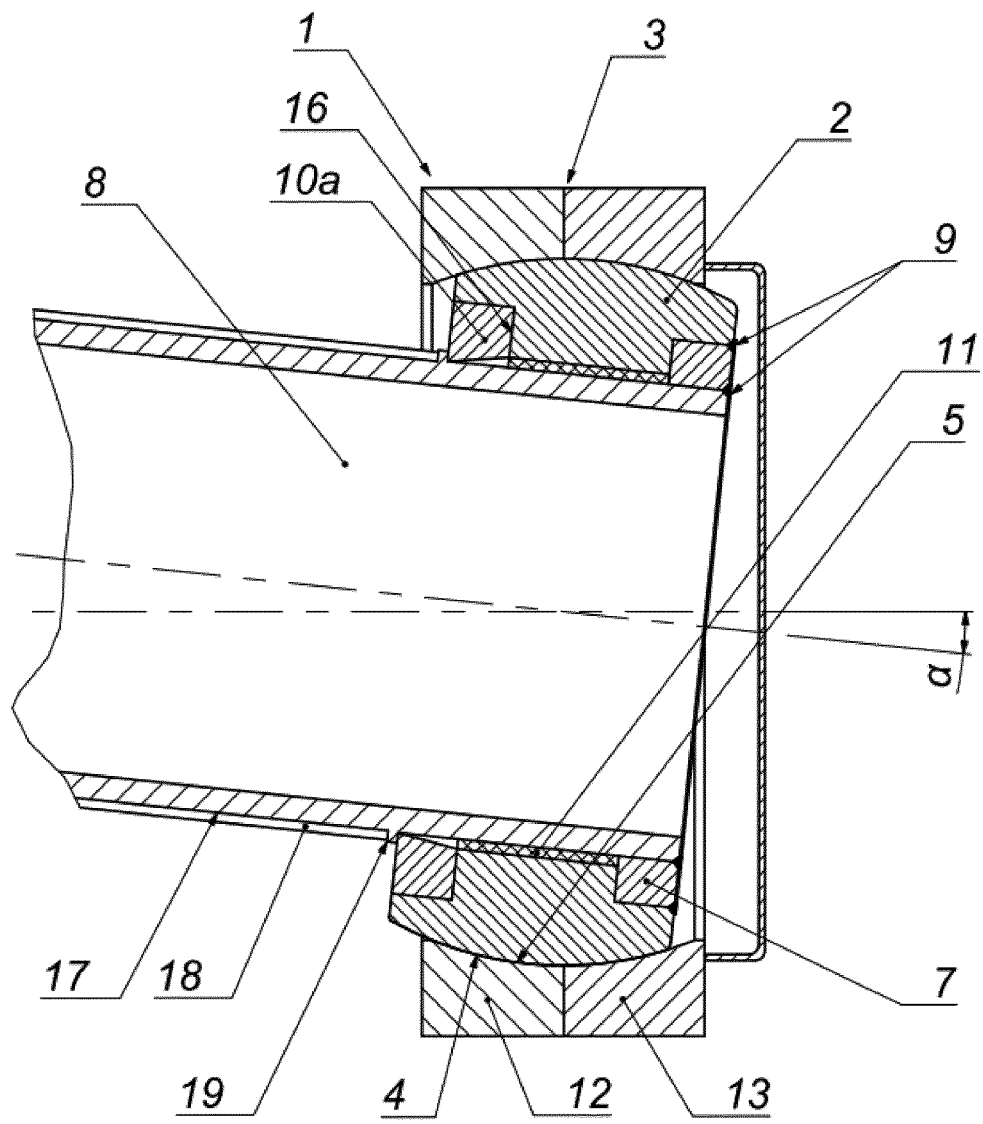
FIG. 2 shows a fragment of the device according to the invention before collision, with the visible angular displacement of the inner ring relative to the outer body, in axial cross-section.

As shown in the preferred example in FIG. 2, by using an articulated connection of the outer body 3 relative to a inner ring 2 embedded directly therein, it is possible to obtain angular displacement of said elements relative to one another. The angle of deflection of the body 3 relative to the inner ring 2 has been marked in the drawing with a symbol a. As shown in FIG. 2, despite the body being moved by an angle of 6°, the inner ring 2 remains in the axis of the rod 8. This position of the inner ring 2 relative to the rod 8 is ensured in the solution according to the invention, also after collision, in the energy absorption step by cutting the rod 8. In the solution shown in FIG. 2, the inner ring 2 has a cutting knife 10a in the form of a ring, placed in the undercut 16. The rod 8 has longitudinal grooves 17 formed in the cutting part thereof. With such a construction of the rod 8, only longitudinal projections 18 are essentially intended for cutting.

Such a structure of the rod 8 facilitates the cutting process by means of a cutting knife 10, 10a with an annular cutting part. In this case, essentially only the longitudinal projections 18 are cut, and the parts of the cutting blade of the knife 10 and 10a are sliding over the surface of the bottoms of the longitudinal grooves 17. In addition, this design provides for better chip removal in the cutting process and thereby further improves the axial guidance of the inner ring 2 relative to the rod 8.

The rod 8 is provided with shaped peripheral humps 19, touching the blade of the knife 10a, whose shear strength determines the limit of the pressure force of the railway cars on each other at which the energy absorption by cutting is initiated. The size of the peripheral humps 19 can be chosen arbitrarily, depending on the mass of the connected railway cars.

Figure 3:
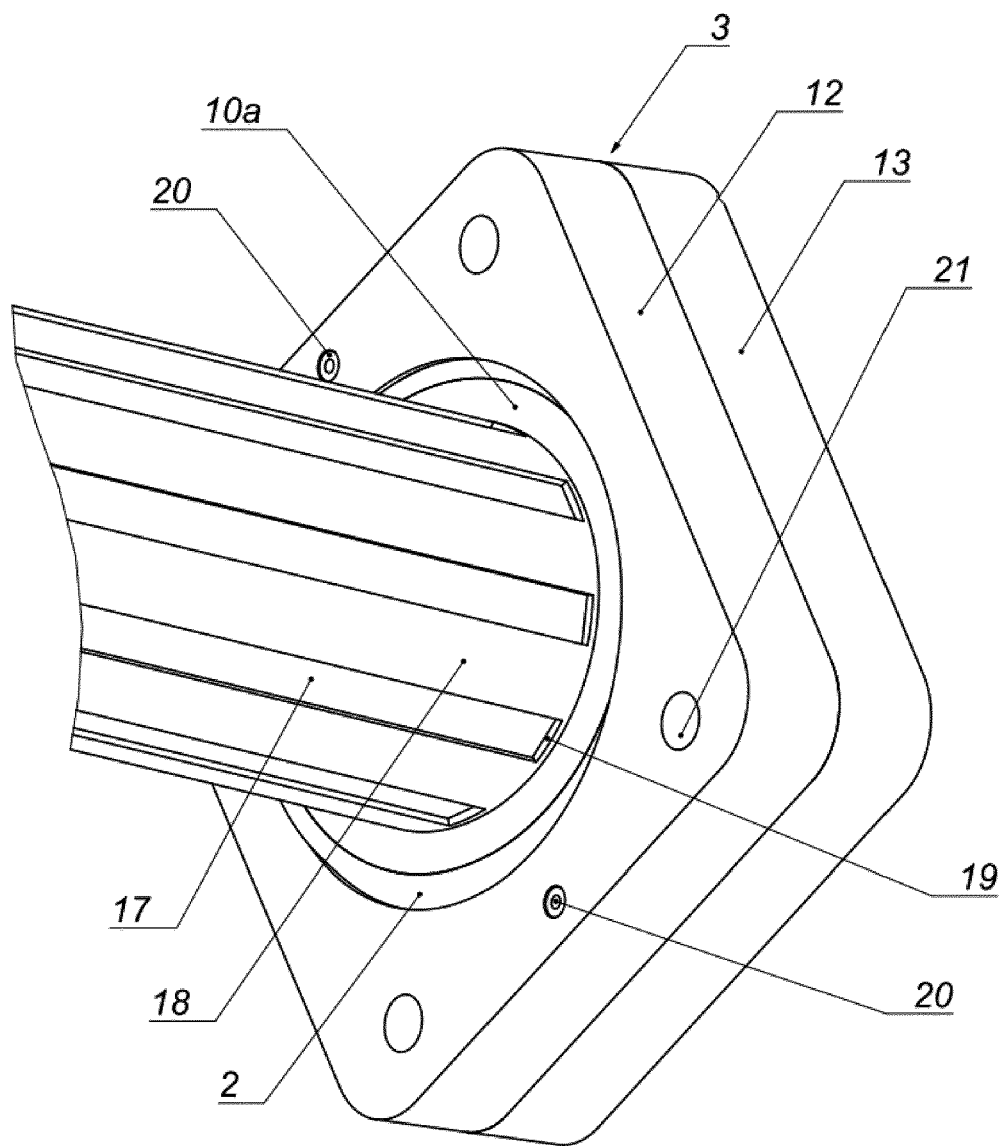
FIG. 3 shows a fragment of a device of FIG. 2 in axonometric view.

As shown in FIG. 3, plates 12 and 13 forming the body 3 are connected to one another by means of screws 20. The body 3 also has four through-holes 21 for attachment to a rail vehicle end sill, not shown in the drawing.

Figure 4:
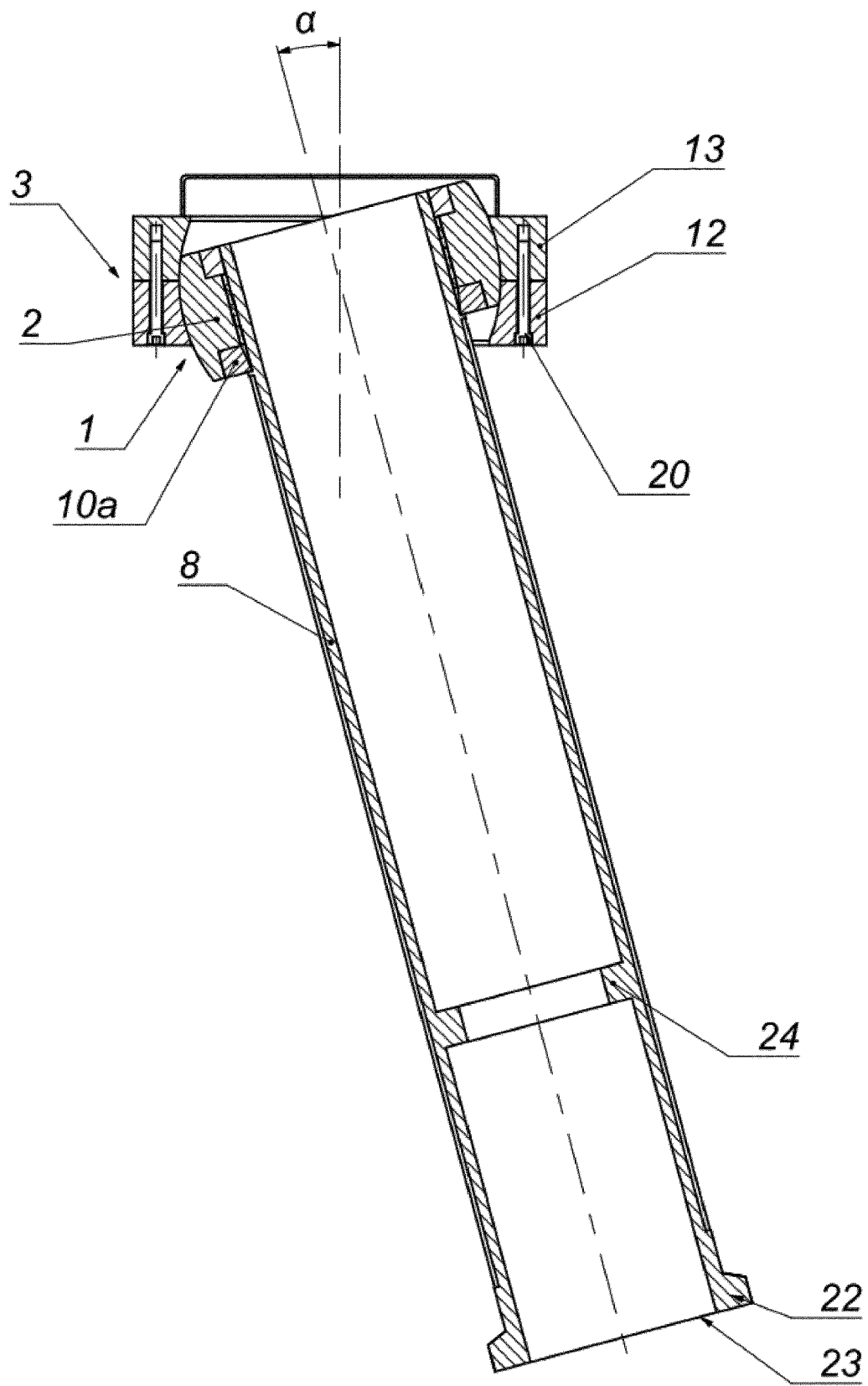
FIG. 4 shows the whole device according to the invention, in axial cross-section with the visible angular displacement of the inner ring relative to the outer body.

FIG. 4 shows the same device as in FIG. 2 and FIG. 3, with the plates 12 and 13 interconnected frontally by means of screws 20. In the shown figure, the angle $\alpha$ of the outer body deflection is equal to 15°. At this limiting deflection, the cutting knife 10a mounted in the inner ring 2 of the articulated support 1 is capable of uniformly machining the surface layer of the rod 8. In the end part of the rod 8 a front outer ring 22 is formed, acting as a engaging element. In addition, a stopper ring 24, designed to cooperate with other complementary energy dissipation mechanisms, is formed in the interior of the rod 8, at a distance from its front surface 23.

Figure 5:
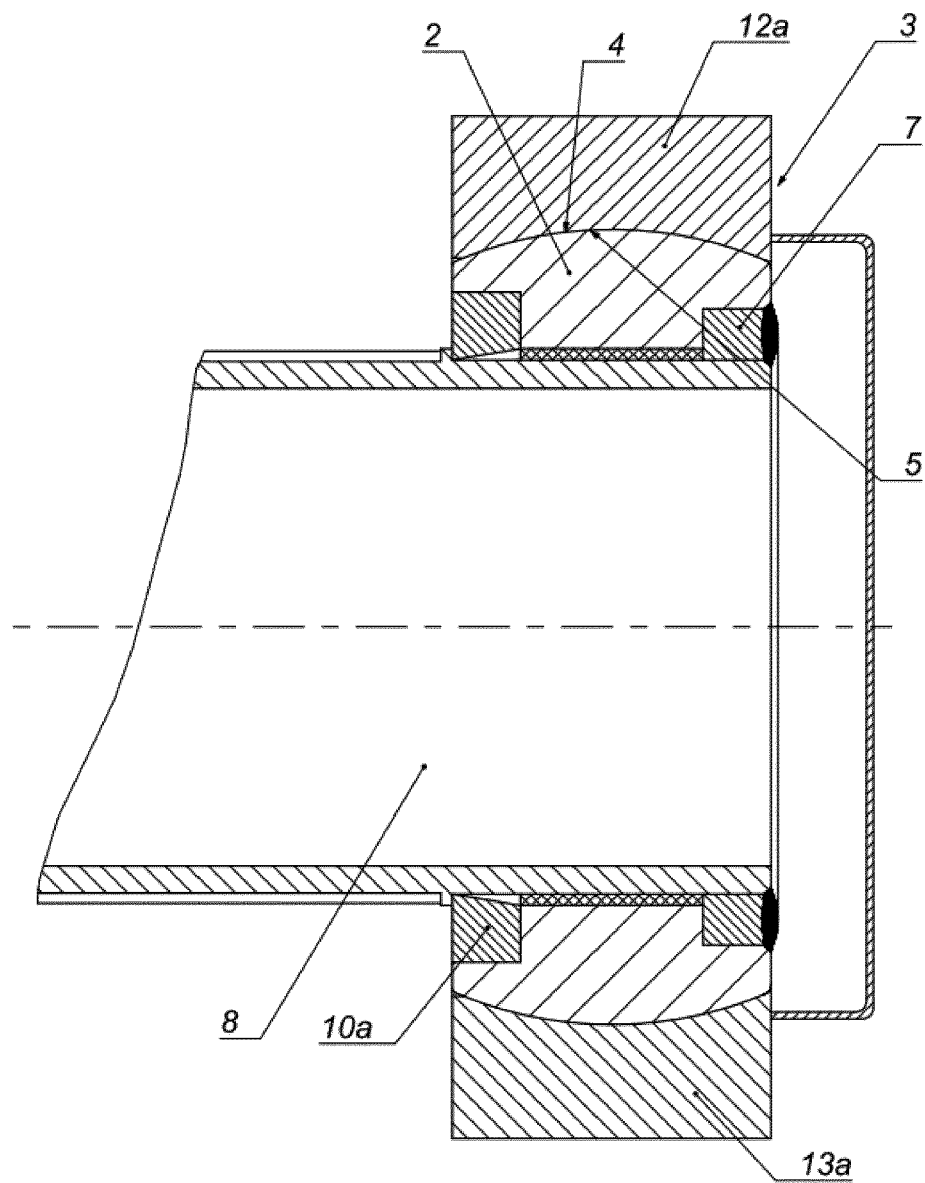
FIG. 5 shows a fragment of the device according to the invention with the external body formed of two plates interconnected in a direction perpendicular to the axis of the rod.
Figure 6:
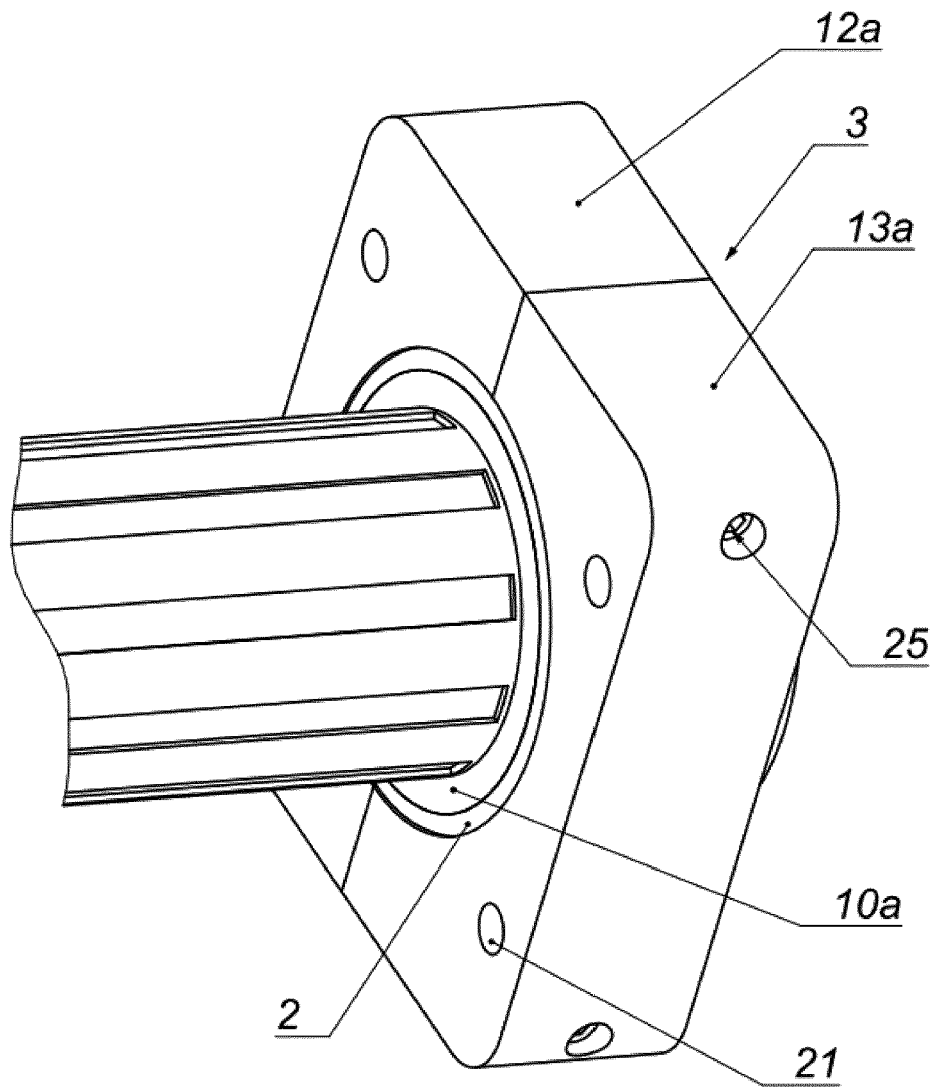
FIG. 6 shows a fragment of a device of FIG. 5 in axonometric view.
Figure 7:
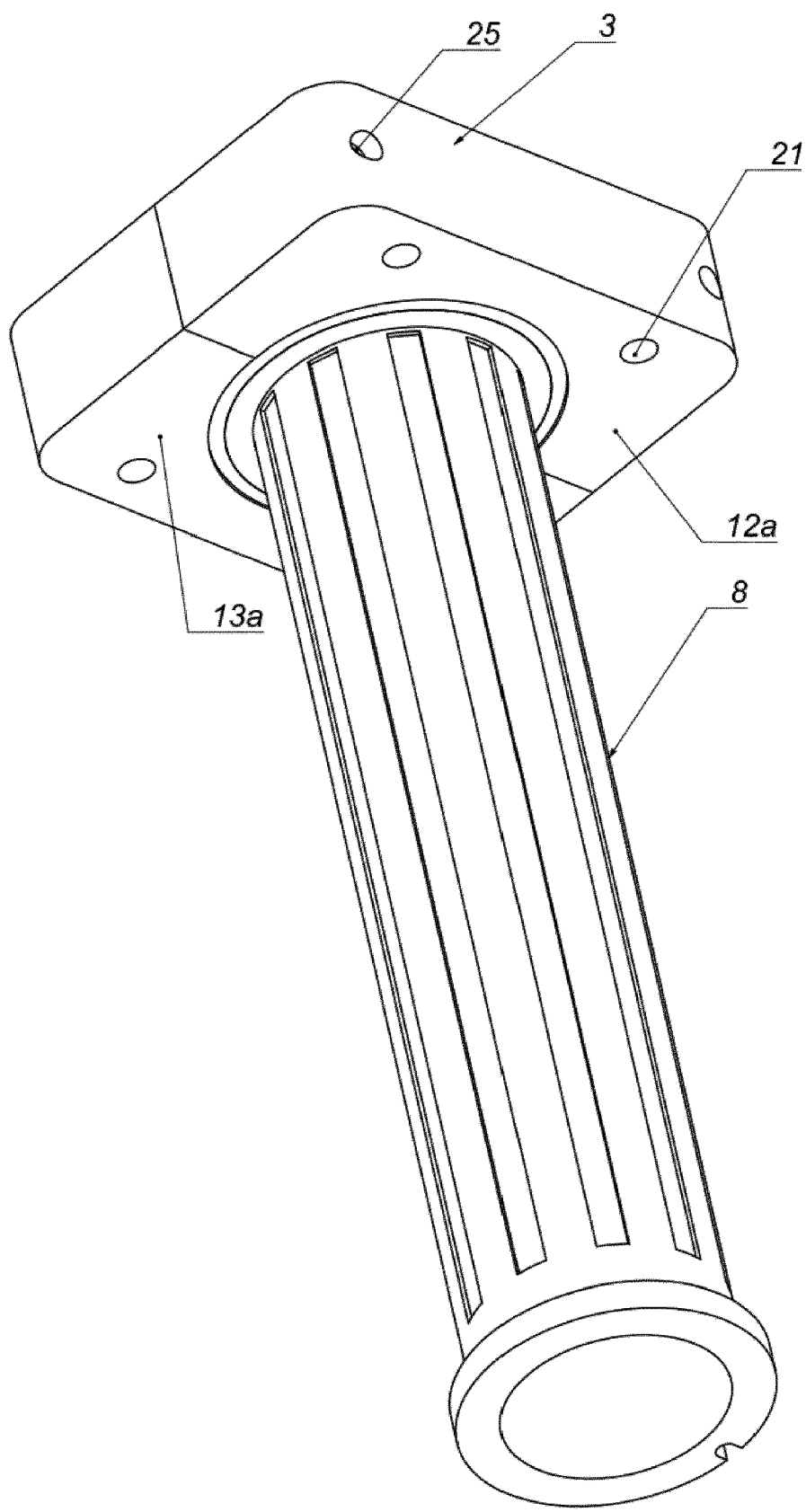
FIG. 7 shows the whole device of FIG. 5 in axonometric view.

FIG. 5, FIG. 6 and FIG. 7 show an alternative embodiment of a railway car energy dissipation device, in which two plates 12a and 13a forming a body 3, with a an internal spherical-shaped surface 5 intended for sliding engagement with an outer spherical surface 4, are connected to each other in a direction perpendicular to the axis of the rod 8 at its neutral position. These plates are pressed against each other by means of screw fasteners 25. The parting plane of the plates 12a and 13a, at the zero angle $\alpha$, is situated on the axis of the rod 8.

Figure 8:
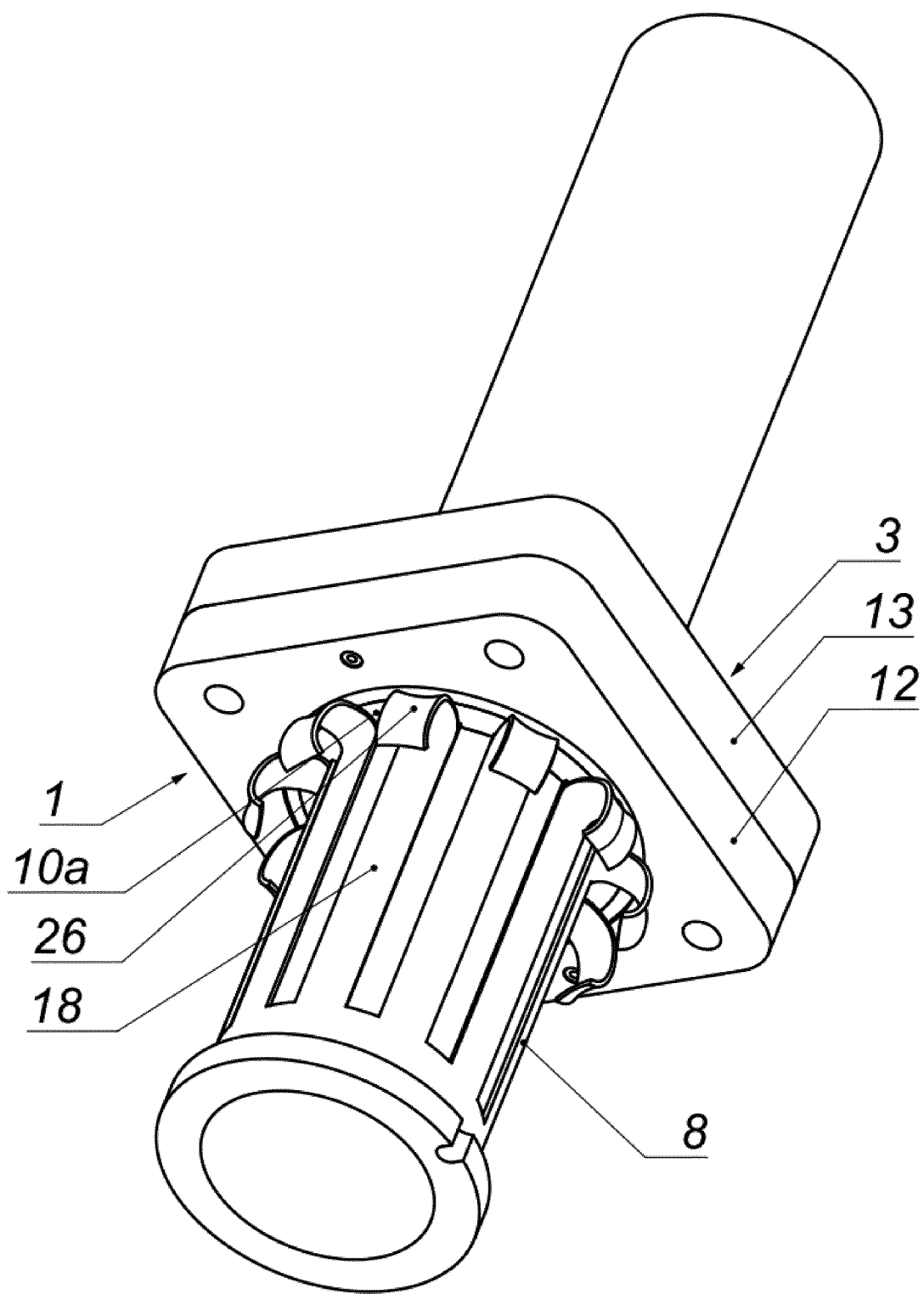

After exceeding the limit pressure forces of the railway cars connected together, the surface layer of the rod 8 is machined. In such circumstances, as shown in FIG. 8, the body 3 of the articulated support 1 moves along the axis of the rod 8, and the knife 10a cuts the longitudinal projections 18, at their entire height, producing chips 26.

Figure 9:
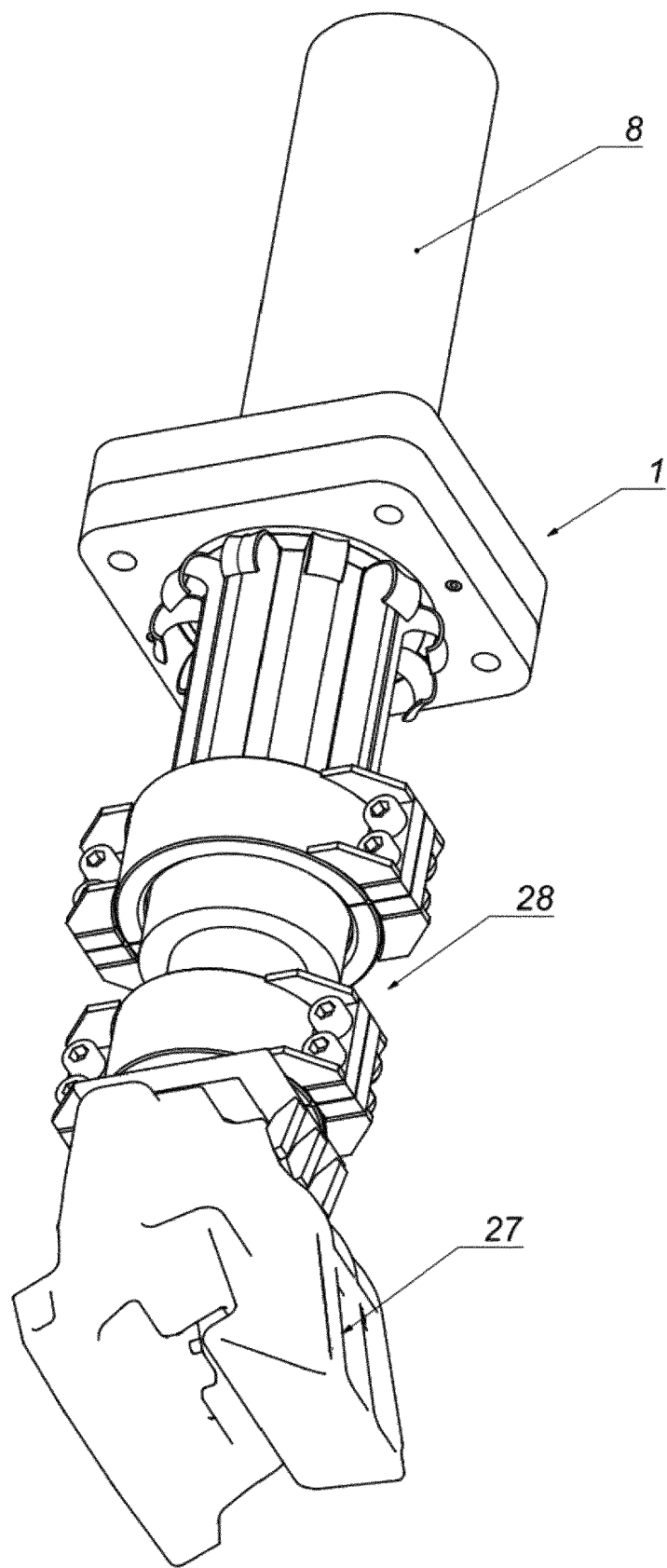
FIG. 9 shows the device dissipating collision energy, connected to the coupling head during the energy dissipation step by cutting the rod.

FIG. 9 shows an energy dissipating device during the step of absorbing collision energy. A coupling head 27 is connected to the machined rod 8 by a known elastomeric energy dissipation mechanism 28. Such a combination enables a gentle cushioning of the alternating tensile and compressive forces occurring during normal operation of the railway car coupling.

LIST OF REFERENCES

1—Articulated support;
2—Inner ring;
3—Body;
4—External spherical surface;
5—Internal spherical surface;
6—Undercutting;
7—Fastening ring;
8—Rod;
9—Welding:
10—Cutting knife shaped as part of an inner ring;
10a-Cutting knife in the form of an annular insert set in the frontal undercut of the inner ring;
11—Stabilizing sleeve;
12, 13; 12a, 13a—Body plates;
14—Pleated cone-shaped protective cover;
15—Protective lid;
$\alpha$—Body deflection angle relative to the inner ring;
16—Undercutting;
17—Longitudinal grooves;
18—Longitudinal protrusions;
19—Peripheral humps;
20—Screws;
21—Through-holes;
22—Front outer ring;
23—Front surface;
24—Stopper ring;
25—Screw fasteners;

26—Chips;
27—Coupling head;
28—Elastomeric energy dissipation mechanism.

The invention claimed is:

1. A device for dissipating the collision energy of railway cars comprising a rod mounted in an articulated support and suitable for cutting with a cutting tool, characterized in that the articulated support comprises a body with an internal spherical surface in which an outer spherical surface of an inner ring is movably mounted, wherein the inner ring of the articulated support has at least one cutting knife designed to cut the surface layer of the rod.

2. The device according to claim 1, wherein the inner ring of the articulated support is connected to the rod by means of a breakable element in the form of a fastening ring.

3. The device according to claim 1, wherein the cutting knife is shaped in the form of a ring with an annular cutting part.

4. The device according to claim 1, wherein the cutting knife forms part of the inner ring of the articulated support.

5. The device according to claim 1, wherein the cutting knife has a form of an annular insert set in a front-end undercut of the inner ring of the articulated support.

6. The device according to claim 1, wherein inside the inner ring of the articulated support, a stabilizing sleeve is placed between the cutting part of the cutting knife and the fastening ring.

7. The device according to claim 1, wherein the body of the articulated support is made in the form of two interconnected plates, and each of these plates has a shaped part of the inner spherical surface.

8. The device according to claim 7, wherein the body of the articulated support is made of two plates connected to each other frontally.

9. The device according to claim 7, wherein the body of the articulated support is made of two plates interconnected perpendicularly to the axis of the rod.

10. The device according to claim 1, wherein the articulated support has a pleated cone-shaped cover on one side attached to the front surface of the body and, on the other side, mounted on the periphery of the rod.

11. The device according to claim 1, wherein the rod has the form of a one-segment sleeve.

12. The device according to claim 1, wherein the rod has longitudinal grooves on an outer cylindrical surface of the rod.

13. The device according to claim 12, wherein the rod has in its inner space a stopper ring set away from the front surface.

14. The device according to claim 1, wherein the rod has an end in the form of a front outer ring.

15. The device according to claim 1, wherein the articulated support body has through-holes for connection with the rail vehicle end sill.

* * * * *